United States Patent

Meadow (10) Patent No.: US 12,217,270 B2
(45) Date of Patent: Feb. 4, 2025

(54) CERTIFIED QUICK RESPONSE CODES ASSOCIATED WITH TOP-LEVEL DOMAINS VERIFIED BY TRUSTED PRODUCT CERTIFICATE AUTHORITY

(71) Applicant: LOCATORX, INC., Atlanta, GA (US)

(72) Inventor: William D. Meadow, Jacksonville, FL (US)

(73) Assignee: LocatorX, Inc., Atlanta, GA (US)

( * ) Notice: Subject to any disclaimer, the term of this patent is extended or adjusted under 35 U.S.C. 154(b) by 333 days.

(21) Appl. No.: 17/834,415

(22) Filed: Jun. 7, 2022

(65) Prior Publication Data

US 2022/0414680 A1 Dec. 29, 2022

Related U.S. Application Data

(63) Continuation of application No. 16/745,024, filed on Jan. 16, 2020, now Pat. No. 11,379,853.

(60) Provisional application No. 62/793,209, filed on Jan. 16, 2019.

(51) Int. Cl.
*G06Q 30/018* (2023.01)
*G06F 16/955* (2019.01)
*G06K 19/06* (2006.01)

(52) U.S. Cl.
CPC ....... *G06Q 30/018* (2013.01); *G06F 16/9554* (2019.01); *G06K 19/06037* (2013.01)

(58) Field of Classification Search
CPC .............. G06Q 30/018; G06Q 30/0185; G06F 16/9554; G06K 19/06037
USPC ........................................... 235/494; 705/318
See application file for complete search history.

(56) References Cited

U.S. PATENT DOCUMENTS

| 10,230,705 | B1* | 3/2019 | Joshi | H04L 63/123 |
| 2014/0252077 | A1* | 9/2014 | Corby | G06K 5/00 235/375 |
| 2015/0178521 | A1* | 6/2015 | Ching | G06K 5/00 235/375 |
| 2017/0041309 | A1* | 2/2017 | Ekambaram | H04L 63/1483 |
| 2017/0091505 | A1* | 3/2017 | Chamandy | G06K 19/06056 |

FOREIGN PATENT DOCUMENTS

WO 2018103756 A1 6/2018

* cited by examiner

*Primary Examiner* — Paultep Savusdiphol
(74) *Attorney, Agent, or Firm* — Joseph P. Kincart; Tracnik law PLLC (57) ABSTRACT

A unique identifier can be associated with a commerce good. A computing system can receive a first query with a first value of a particular attribute and the unique identifier. The computing system can receive a second query with a second value of the particular attribute and the unique identifier. The computing system can determine a difference between the first value and the second value of the particular attribute. The computing system can determine that the difference between the first value and the second value meets a particular threshold. The computing system can determining an authenticity of the commerce good responsive to the difference meeting the particular threshold.

20 Claims, 5 Drawing Sheets

CERTIFIED QUICK RESPONSE CODES ASSOCIATED WITH TOP-LEVEL DOMAINS VERIFIED BY TRUSTED PRODUCT CERTIFICATE AUTHORITY

CROSS-REFERENCE TO RELATED APPLICATIONS

This application is a continuation of U.S. application Ser. No. 16/745,024, filed Jan. 16, 2020, and entitled "CERTIFIED QUICK RESPONSE CODES ASSOCIATED WITH TOP-LEVEL DOMAINS VERIFIED BY TRUSTED PRODUCT CERTIFICATE AUTHORITY," which claims priority to U.S. Provisional Patent Application No. 62/793,209, filed Jan. 16, 2019, and entitled "Certified Quick Response Codes Associated with Top-Level Domains Verified by Trust Protect Certificate Authority," the contents of which are hereby incorporated in their entireties.

FIELD OF THE DISCLOSURE

The present invention relates to certified Quick Response codes associated with top-level domains verified by a trusted product certificate authority.

BACKGROUND OF THE DISCLOSURE

Counterfeit, stolen, and diverted/gray market components and goods cost the economy approximately one dollar per day for every person on Earth. Counterfeit goods adversely impact brand reputations, hurt consumers, cause critical system failures, and fuel organized crime. Sophisticated counterfeiting techniques include unauthorized production overruns on the gray market from authorized contract manufacturers, full-device reverse engineering and reproduction in unauthorized factories, supply chain interdiction, and parts recycling and remarking. In short, consumer and manufacturer confidence in the authenticity of products bought and sold are at all-time lows.

Additionally, many products sold today bear on their labels two-dimensional barcodes, such as Quick Response codes ("QR codes"). QR codes are routinely scanned by consumers with smart devices that have cameras, or other QR code readers. QR codes have a number of important uses, such as enabling payment, simplifying website login procedures, or even marking gravestones. Consumers have been conditioned to scan QR codes without giving the QR codes a second thought.

This is problematic because QR codes may also point to a specific URL, such as the website of a product on which a QR code is affixed. A counterfeiter or other bad actor may modify the QR code on the product label to point the scanner to a URL that leads to a website containing malware. In addition to harming the consumer, this may harm the manufacturer of the product by denigrating its reputation and potentially sending representatives of the manufacturer to the same malware-infested website.

SUMMARY OF THE DISCLOSURE

Accordingly, what is needed is a trusted QR code label that may also assist in counteracting counterfeiters. The present invention provides Certified QR Codes ("CQRs"). Product labels may contain a CQR that points to a website with a unique top-level domain ("TLD") associated with a trusted Product Certificate Authority ("PCA"). The PCA may create a unique URL for each product containing a CQR, thus allowing for individualized tracking of products. At the same time, by virtue of the association with the PCA, a consumer may trust a URL obtained from a scanned CQR. Thus, the PCA, through its TLD, becomes the trusted gatekeeper to legitimate product communication.

BRIEF DESCRIPTION OF THE DRAWINGS

The accompanying drawings, which are incorporated in and constitute part of this specification, illustrate some embodiments of the disclosure and, together with the description, serve to explain the principles of the disclosure.

In the following sections, detailed descriptions of examples and methods of the disclosure will be given. The description of both preferred and alternative examples, though thorough, are exemplary only. It is understood to those skilled in the art that variations, modifications, and alterations may be apparent. It is therefore to be understood that the examples do not limit the broadness of the aspects of the underlying disclosure as defined by the claims.

DETAILED DESCRIPTION

The present disclosure provides generally for apparatus, methods and systems for affixing unique CQRs to respective products and associating the unique CQR with a certified top-level domain associated with a PCA to establish a system of trusted product communications and counterfeit tracking. The PCA may provide a unique TLD to ensure a consumer scanning a CQR that the consumer is, in fact, scanning a CQR (instead of a traditional QR code) and thus may trust the URL at the other end of the CQR. Note that this disclosure may describe CQRs as being part of (or the entirety of) a two-dimensional barcode; however, one schooled in the art will understand that the present disclosure applies with equal efficacy to three-dimensional barcodes.

In some embodiments, an incentive is provided to a user (such as a shopper) to scan a CQR. The incentive may include an artifact, such as a discount, a coupon, product specifications, product user manual or other CQR-specific information. Where previous product labels would use the same label design and label content for multiple disparate labels and therefore multiple disparate product units, the present invention provides for a unique label design and label content for each label and therefore each product unit.

A unique label on each product unit enables many useful advantages over more generic labeling systems. One advantage is that when a user scans a CQR and contacts an associated URL, an app on the user's smart device may send to the URL not only the CQR information, but also a time, date and location of a scan. In this manner, the present system includes inherent capabilities to ascertain the authenticity of a product at a quantified location as captured at a recorded time and date. Previous systems simply did not have the capability to provide such service.

Figure 1:
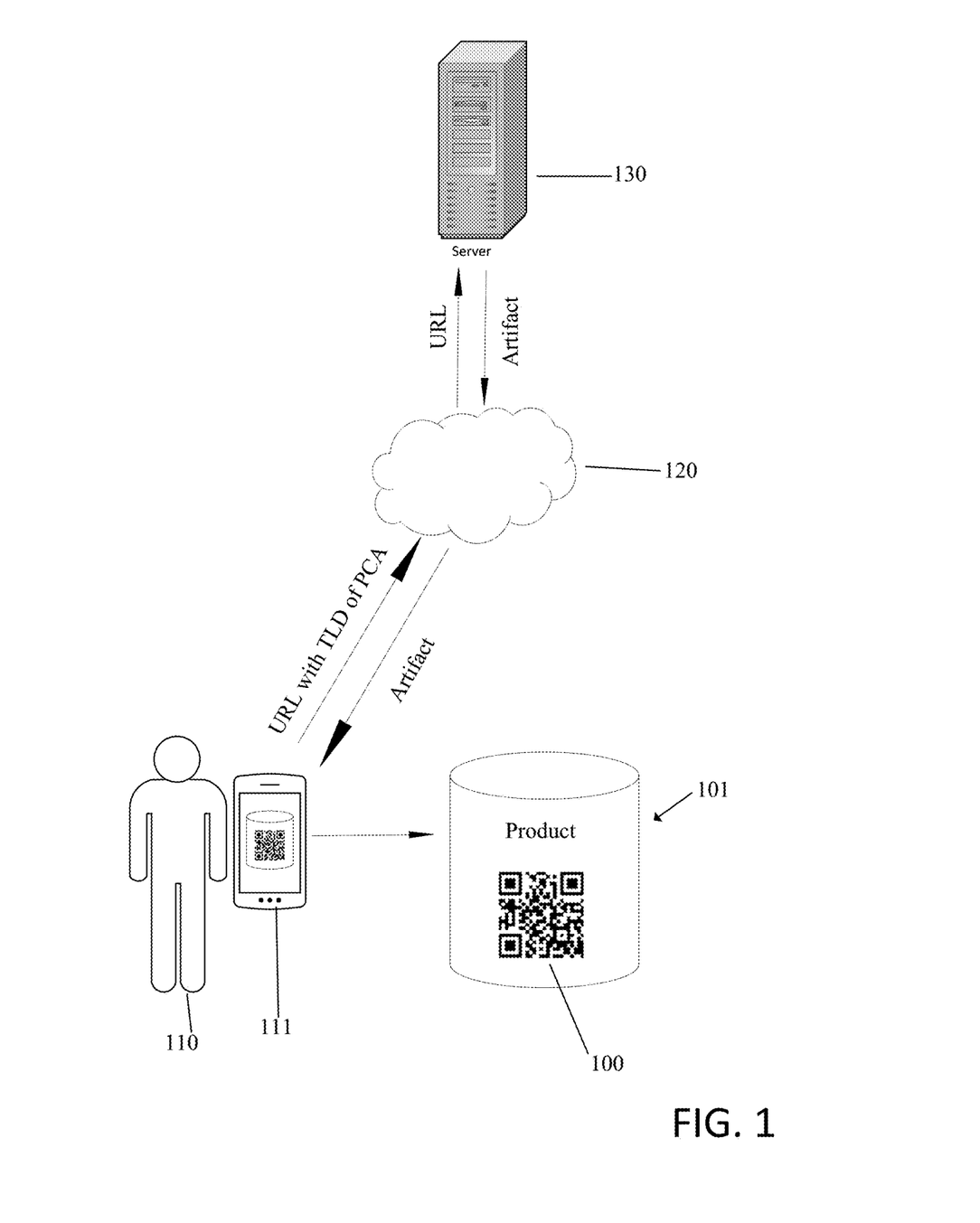
FIG. 1 illustrates a system in accordance with the present disclosure.

Referring now to FIG. 1, a system in accordance with the present disclosure is shown. Consumer 110 may be interested in product 101. Product 101 may have a label with CQR 100 affixed to the label. In some embodiments, CQR 100 is unique to the particular product 101 (thus giving product 101 a unique label), while in other embodiments, CQR 100 may correspond to more than one manufactured version of the same product (e.g., all 20 ounce bottles of a particular brand of mayonnaise) or even to all products manufactured by a manufacturer (e.g., all mayonnaise manufactured by a particular manufacturer). CQR 100 may be a standard QR code (made unique by reference to a specialized, PCA-approved TLD, as described below) generated using known QR code-generating processes. Consumer 110 may scan CQR 100 with a scanner 111. Scanner 111 may be a smart device, such as a smart phone, or any other device comprising an image capture apparatus and in logical connection with a communications network 120 such as the Internet.

Unlike traditional QR codes, the URL associated with the CQR 100 may comprise a TLD associated with a trusted PCA. The PCA may be any organization, standards board, corporation, or other entity that users and manufacturers can agree is sufficiently trustworthy. Upon scanning CQR 100, scanner 111 can engage in communication with server 130 via a communications network 120. Server 130 receives the requested URL (which, as described later, may provide server 130 with additional information) and may return an artifact, such as a coupon or product specifications.

Suppose the PCA is a large, multi-national company trusted by most consumers in commerce. The PCA may create a unique TLD associated with it. For example, the TLD may be .PCA, or be based on the name of the PCA (e.g., if the PCA is LocatorX, Inc., then the TLD may be .lctrx). By way of example, suppose Olive Oil Co. ("OOC") decides to address a counterfeit olive oil problem. OOC may contract with the PCA for the right to use the PCA's TLD. OOC may then have the right to affix CQRs such as CQR 100 on its olive oil bottles. In some embodiments, CQR 100 may simply point to a domain name like http://oliveoilco-.pca. That the URL ends in .pca may assure the scanning consumer 110 that the scanned bottle of OOC olive oil is the genuine article. In some embodiments, the TLD may be a pseudo-domain, such as the one formerly used for Tor services. In some embodiments using pseudo-domains, a CQR scanner may be operable to interface with a network other than the Internet or the World Wide Web through a gateway. Such an embodiment may be desirable to add extra security features that may not be available through the publicly accessible Internet.

In some embodiments, each individual product may have a unique universal identifier ("UUID") associated with it. The UUID may be generated by the Open Software Foundation or other trusted UUID generator. The UUID may comprise a global trade item number (known in the art as a "GTIN"). Accordingly, a CQR 100 may point to a more individualized URL for the particular product label scanned; for example, the CQR 100 may point to the URL oliveoilco.pca/UUID. In other embodiments, a hash code may be generated in addition to or instead of the UUID. Thus, the CQR 100 may point to oliveoilco.pca/hash or oliveoilco-.pca/UUID&hash. Additionally, the URL and/or CQR 100 may comprise public— private key infrastructure (known in the art as "PKI") information, such as a certification authentication information.

In further embodiments, the CQR 100 may have an additional dynamic value based on some characteristic of the consumer or product. For example, CQR 100 may point to oliveoilco.pca/UUID&hash&GPS_Location. While the UUID or hash may be encoded in the CQR 100 itself, a GPS_Location value may be based upon a GPS location of scanner 111 or an associated smart device. This may assist manufacturers in determining authenticity of products being offered for sale at a given location. It may also assist in locating counterfeit products because server 130 receives the GPS location of scanner 111 through an CQR scanner's transmission to the URL. And it may, in some embodiments, provide assurances to the end-user, as the dynamic values may provide data regarding the number of times the CQR has been scanned.

For illustration purposes, and by way of non-limiting example, if two bottles of a product item, such as olive oil, with a same UUID are scanned within a short timeframe at respective locations of considerable distance from each other, such as at opposite corners of a country, then the manufacturer may be able to infer that at least one of those bottles is a counterfeit. By having the benefit of the additional information encoded in the URL from a GPS Location value, the manufacturer may locate the counterfeit bottles. A GPS Location with an extensive history of potentially counterfeit products may warrant additional investigation. The website corresponding to the URL on the CQR 100 may also request the GPS location directly from the consumer's scanner 111 or retrieve the location of scanner 111 through image metadata, such as EXIF metadata. Similarly, even a single bottle of oil with an unrecognized UUID, or no UUID, may be flagged as unauthentic. Moreover, combining these inauthenticity data points in the aggregate may assist manufacturers in determining weaknesses in a supply chain, locations of common counterfeiters, and the like.

In some embodiments, each CQR 100 is a unique label for each product 101. Accordingly, a PCA may validate a manufacturer's domain name and provenance prior to creating CQRs to affix to the products. Again, the end-user (e.g., shopper) may have increased confidence in the authenticity of the product by virtue of the reference to the PCA.

In some embodiments, a CQR may include one half of a public/private key or other form of cryptography. Public-key cryptography, or asymmetric cryptography, may be utilized in conjunction with a CQR as a cryptographic system that uses pairs of keys (public keys) which, are known only to the owner and may be included, for example within the CQR code. Public keys may be indicative of, or otherwise associated with certified TLD. The generation of such keys may be based upon cryptographic algorithms or otherwise associated with mathematical problems to produce one-way functions. Since effective security requires keeping a private key private; the private key may be encoded into a CQR and not readily ascertainable to a user. In some embodiments, the private key may be sent to the end-user by another method, such as an app. The public key indicative of or otherwise associated with the TLD may be openly distributed without compromising security.

In such a system, a manufacturer can encrypt a product label using the PCA's public key to ascertain the TLD, and also include an encrypted label portion that can be decrypted via a contacted URL recognizing private key also included in the label. Conversely, the private key may be used by the PCA to "sign" the CQR, and the end-user's public key may be used to verify authenticity.

Accordingly, the present invention teaches how a TLD may become a trusted gatekeeper to legitimate product information and also be a recipient of data indicative of fraudulent or otherwise unauthentic products on the market.

By linking the TLDs with the PCA through the CQRs, more trusted commerce may occur.

Figure 2:
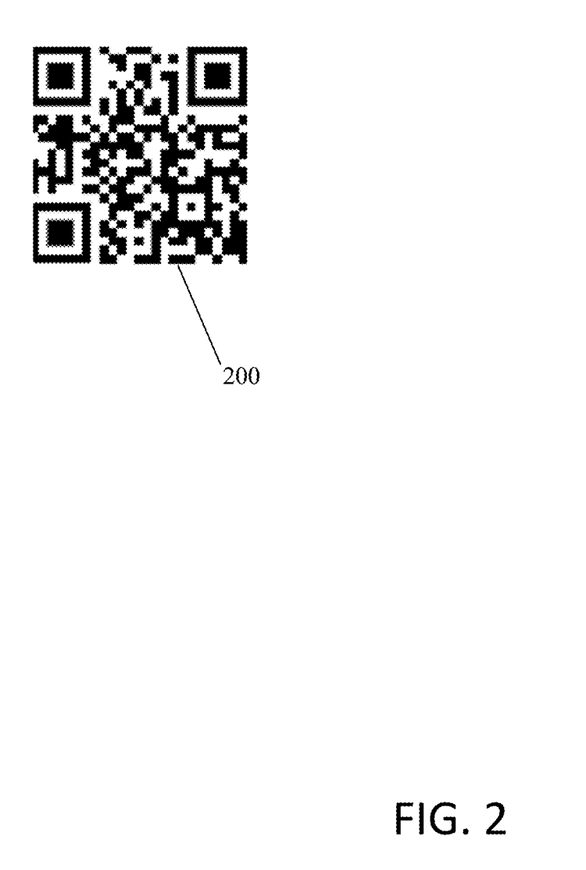
FIG. 2 illustrates an exemplary CQR.

Referring now to FIG. 2, an exemplary CQR is shown. CQR 200 points to the URL http://www.locatorx.pca. The TLD of this URL is .pca, which is associated with a trusted PCA. As described above, in some embodiments, the TLD may be based on the name of the particular PCA, such as .lctrx.

Figure 3:
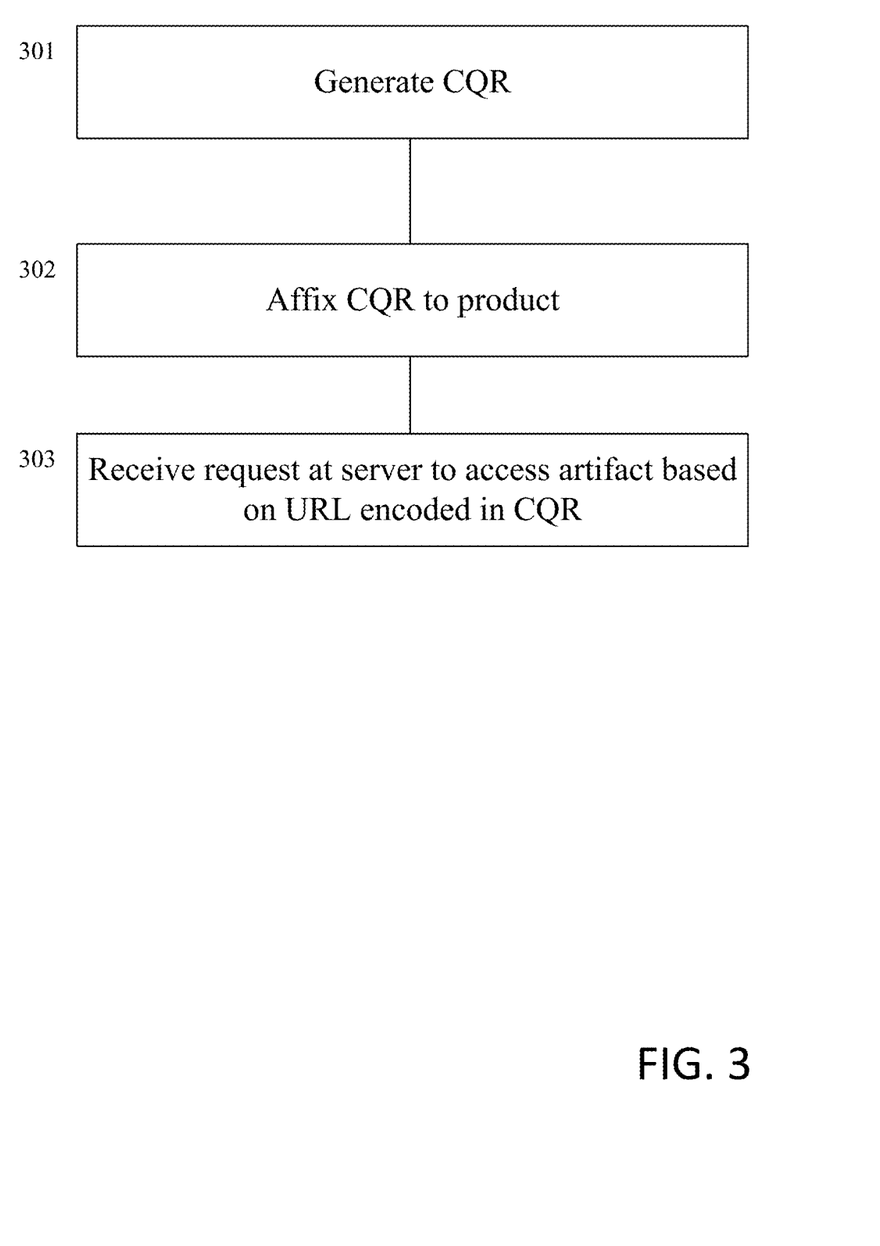
FIG. 3 illustrates an exemplary method in accordance with the present disclosure.

Referring now to FIG. 3, an exemplary method for tracking a product using the described CQRs is shown. At step 301, a CQR is generated. The CQR may be unique to the particular product being tracked (e.g., a particular bottle of olive oil), or to all products in a particular line (e.g., all 20 ounce bottles of 00C-brand mild olive oil). The CQR comprises an encoded URL that is decoded by a scanner, such as a smart device, that is capable of reading CQRs and is in logical connection with a communications network. The encoded URL comprises a protocol identifier (e.g., http://), a resource name (e.g., oliveoilco), and a TLD associated with a PCA (e.g., .pca or .lctrx). In some embodiments, the CQR further comprises a UUID, such as a GTIN. In some embodiments, the UUID is associated with a manufacturer's website. The CQR may be based on individualized certifications of a given product by the PCA, or the PCA may assign a batch of certifications to a series of CQRs.

At step 302, the two-dimensional barcode with the CQR is affixed to a product. The two-dimensional barcode may be printed concurrently with the product label or may be affixed subsequent to the printing of the product label.

At step 303, a request to access an artifact located on a server is received by the server in logical connection with a communications network. This request may occur when a consumer attempts to access the URL encoded on the CQR through the communications network. The artifact may be one or more of: a coupon, product specifications, or a product verification. The artifact requested from and/or sent by the server may be based on the URL encoded in the CQR. For example, a manufacturer might limit a coupon to only certain UUIDs. Alternatively, a hash may indicate a particular line of products (e.g., 20 ounce bottles of olive oil), and the corresponding transmitted product specifications (e.g., nutrition facts) may be based on that particular line of products.

Included in the request may be one or more geographic indices. For example, if the request is transmitted using a CQR scanning application (including a smart phone camera device, dedicated quick response code scanner, and the like), then image data associated with the scan may include metadata indicative of a geographical location. For example, the image data may include EXIF data or GPS coordinates. In such an embodiment, the geographic indices may be transmitted along with the request.

The server may associate a time index with the request. The server may also associate a geographic index with the request. Accordingly, the server may begin to populate a database in which, for each unique identifier (e.g., GTIN), a list of one or more times a CQR associated with the unique identifier has been scanned is logged. This may allow the server to track the movement of the product associated with the unique identifier through commerce. This may assist in detecting counterfeiting efforts. For example, if the log shows that a CQR has been scanned (i.e., the server has received artifact requests for) in Maine at time t=0, and then at time t=5 seconds, the CQR has been scanned in Arizona, then this may indicate counterfeiting. Such a situation would suggest that the CQR has been copied by a counterfeiter who is duplicating labels. In the aggregate, such disparities may show weaknesses in a supply chain, help identify counterfeiters, etc.

Figure 4:
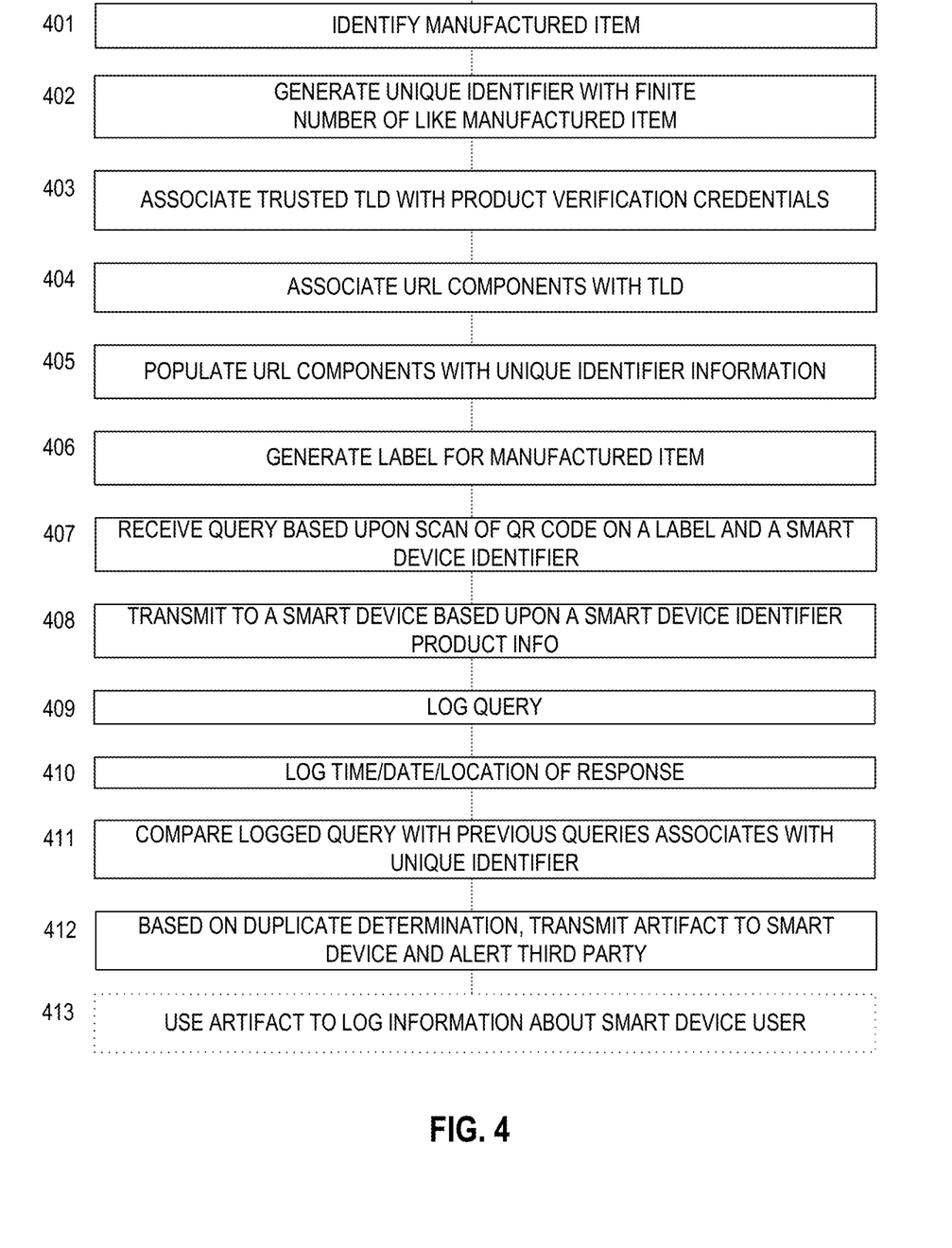
FIG. 4 illustrates another exemplary embodiment of a method for detecting counterfeiting using CQRs comprising URLs with TLDs associated with PCAs.

Referring now to FIG. 4, an exemplary method of detecting counterfeiting using TLDs as accessed through CQRs is shown. At step 401, a commerce item, such as a manufactured good, to be protected is identified. In exemplary embodiments, the commerce item may be a product intended to travel through commerce. The commerce item may be one that is susceptible to counterfeiting. For example, olive oil is a frequent target of counterfeiters because of the ease of deploying a substitute good (i.e., counterfeit olive oil) and deployed labels that may be easy to remove and copy. Similarly, jewelry, apparel, and pharmaceuticals may be targeted for similar reasons. In exemplary embodiments, the identified product may be one that is produced in a large batch, such that its labels are also produced in large batches. (Again, olive oil is a good, but not limiting, example of a batch-produced, batch-labeled product.)

At step 402, a unique identifier is generated that may serve as an authenticity qualifier. The unique identifier may carry some relation to a finite number of related products. For example, the unique identifier could include or be related to any of: a production run identifier, lot number, date (including an expiration date), quality control identifier, location of manufacture, manufacturer line, work shift manufactured, licensed area of sale, and the like. The unique identifier may also contain a relation to a global tracking ID number (i.e., a GTIN). Because it may be desirable to encode additional information into the unique identifier beyond just a GTIN, the unique identifier may, in some embodiments, include several concatenated identifiers. For example, a bottle of olive oil manufactured during production run 3/100, expiring on Jan. 1, 2025, and having GTIN 12345678 may have unique identifier number 003010125123456​78 (i.e., a concatenation of 003 (production run), 010125 (expiration date), and 12345678 (GTIN)).

At step 403, a trusted TLD may be associated with product verification credentials. As stated elsewhere, the TLD may be verified by a PCA. The TLD may reflect the name of the PCA. The PCA may assist in generating labels for the commerce item and in verifying the accuracy of a URL encoded in a CQR. Product verification credentials may include any of the components of the unique identifier generated at step 402, along with a log tracking the progress in commerce and scans related to the commerce item.

Figure 5:
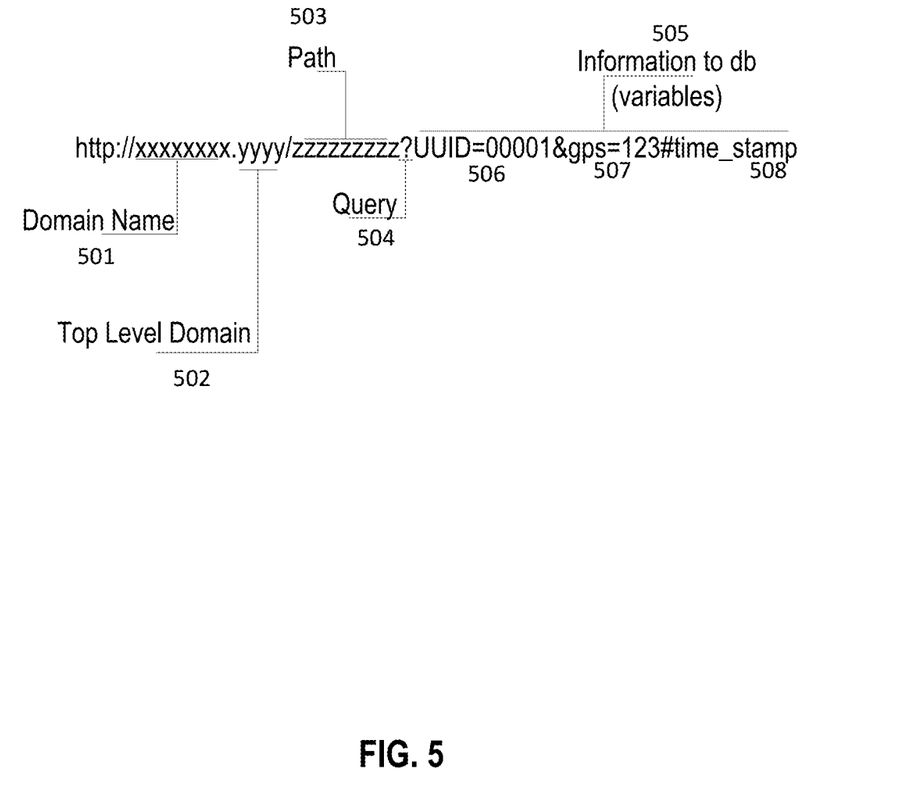
FIG. 5 illustrates an exemplary URL in accordance with the present method.

At step 404, the TLD of the PCA is associated with URL components. Referring briefly to FIG. 5, a URL typically comprises a protocol identifier, a domain name 501, and a top-level domain 502. In some embodiments, the URL will further include path 503. A URL may also comprise additional information 505 relating to database queries 504 or locations in the database, such as queries 506, 507 (typically preceded by a question mark after a path name and linked to other queries with ampersands) and hashes 508. These variables may assist in the authentication process. Some of these queries and hashes may be pre-encoded on the label where they relate to information specific to the product (e.g., unique identifier). Other queries and hashes may be generated by virtue of a scan of the CQR, and appended to the URL, and transmitted to the server, where those queries and hashes relate to the scan itself (e.g., time stamp or GPS location).

Referring back to FIG. 4, at step 405, URL components are populated with unique identifier information. For example, a server receiving a query from a smart device initiated by a scan of a CQR may anticipate in the URL components like unique identifier number, GTIN, lot number, etc. Accordingly, in embodiments in which the unique identifier comprises only the GTIN, a URL encoded in a CQR may still transmit other identifying information, such as expiration date. For example, a URL encoded on a CQR could be oliveoilco.pca/oliveoil16?GTIN=12345678&lot_number=003. As will be discussed later, in some embodiments, a CQR scanner may append additional information to this URL prior to sending a query to oliveoilco.pca, such as a GPS location.

At step 406, a label is generated for the commerce item. The label may include traditional product information, such as brand name, size of the item, nutrition facts, etc. But the label will also include a CQR code comprising the encoded URL referencing the TLD of the PCA. A label including a CQR code may be generated contemporaneously with the product label or separately from the product label and attached to the product label (or elsewhere on the product).

At step 407, a server may receive a query based upon a scan of the CQR code by a smart device. In exemplary embodiments, the query will be transmitted through Internet Protocol, but it may also be transmitted telephonically, by Bluetooth, or through other direct means of communication associated with a smart device identifier (e.g., IP address, MAC address, telephone number, device name, etc.). In exemplary embodiments, then, the query is based on the encoded URL associated with the CQR code. In some embodiments, additional information may be appended to the encoded URL. For example, the encoded URL may further include a GPS location associated with the scan by the smart device of the CQR. In some embodiments, additional data may be transmitted along with the query. For example, in addition to sending a request to the server via the URL, the smart device may also send an image associated with a scan of the CQR. In such an embodiment, metadata associated with the image may also be recorded as datapoints at the server. For example, metadata may include any of: time of image capture, location of image capture, and specifications about the image-capture device (i.e., the smart phone itself and information about its user).

At step 408, based on the query, the server may transmit to the smart device via the smart device identifier a desired artifact. The artifact may include any of: a coupon, a discount, product specifications, product verification information (for example, as by a unique identifier), a recipe, or other information that a consumer may desire relating to a product. And at steps 409 and 410, the query is logged, along with a time, date, and location associated with the query, the server response to the query, the smart device receipt of the query, or action occurring based on the artifact.

At step 411, the server may compare the logged query with previous queries associated with the unique identifier associated with the commerce item. For example, the server may check to see if the same unique identifier has been queried before. If so, the server may compare attributes between the queries, such as the location, time, and smart-device identifier associated with the query. A threat of counterfeiting may be logged based on threshold differences between the attributes associated with the two queries. For example, if the server receives a query associated with an olive oil bottle having GTIN 00000001 at 12:00 EST on Jan. 1, 2020 in Florida, and then receives a query associated with an olive oil bottle having GTIN 00000001 at 12:05 EST on Jan. 1, 2020 in Idaho, then there may be a possibility of counterfeiting (by, for example, theft and copying of the olive oil label containing the CQR). This may be determined due the distance between the two scans exceeding a threshold distance under a threshold amount of time. This is merely a non-limiting example of how to use the present system to detect counterfeiting; other examples will be plain to one of ordinary skill. As an alternative example, in response to the query, the server may transmit to the smart device a coupon including a unique identifier associated with the unique identifier of the product. If it is detected that the same coupon is used multiple times, then that may also indicate counterfeiting. Similarly, duplicate queries may also be indicative of counterfeiting.

At step 412, based on an indication of counterfeiting, the database may generate a counterfeit-warning flag and transmit an alert to an interested party (e.g., the manufacturer, distributor, commerce monitor, law enforcement, relevant consumers, etc.). Moreover, the counterfeit flag may be used to deploy a "honey trap" to provide additional evidence relating to the identity of the counterfeiters. For example, at optional step 413, based on a determination of a potential counterfeit, the originally desired artifact may be transmitted to the smart device that scanned the CQR. If the artifact is a coupon, then the user of the smart device may be prompted to enter an email address or other personally identifying information to use the coupon. By aggregating information about the users of coupons associated with counterfeit flags, weaknesses in the supply chain, vendors aiding counterfeiting, or other vulnerabilities to counterfeiting may be more easily detected. Similarly, if the unique identifier comprises information about a permissible licensed area in which to sell the goods, an artifact transmitted and used outside that licensed area may also assist in counterfeit detection.

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed invention.

Although the present invention has generally been described with reference to the apparatus involved and functionality, the present invention also includes associated method steps for bringing the functionality described into effect.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. A method, comprising:
    associating, via at least one computing device, a unique identifier with a commerce good;
    receiving, via the at least one computing device, a first query comprising a first value of a particular attribute and the unique identifier;
    receiving, via the at least one computing device, a second query comprising a second value of the particular attribute and the unique identifier;
    determining, via the at least one computing device, a difference between the first value of the particular attribute and the second value of the particular attribute;
    determining, via the at least one computing device, that the difference between the first value and the second value meets a particular threshold;
    in response to the difference meeting the particular threshold, determining, via the at least one computing device, an authenticity of the commerce good; and
    upon receiving an indication of counterfeiting, prompting a user of the commerce good to provide a user identifying information.

2. The method of claim 1, wherein the first query is received at a first time, the second query is received at a second time, and the determining of the authenticity of the commerce good is further based on a simultaneous combination of a second difference between the first time and the second time and the difference between the first value of the particular attribute and the second value of the particular attribute regarding a location.

3. The method of claim 1, further comprising transmitting a coupon having a unique identifier associated with the unique identifier of the commerce good, wherein upon detecting that the coupon has been used multiple times, indicating a counterfeiting of the commerce good, wherein the particular attribute comprises a location and the difference comprises a distance between a first location corresponding to the first value and a second location corresponding to the second value.

4. The method of claim 1, further comprising logging, via the at least one computing device, a counterfeit threat in a data store.

5. The method of claim 1, wherein determining the authenticity of the commerce good comprises determining that the commerce good is inauthentic.

6. The method of claim 1, further comprising generating a quick response code ("QR code") comprising the unique identifier, wherein the first query is received in response to a scan of the QR code.

7. The method of claim 6, further comprising:
    generating a label comprising the QR code; and
    affixing the label comprising a brand and the QR code to the commerce good.

8. A system, comprising:
    a data store; and
    at least one computing device in communication with the data store, the at least one computing device being configured to:
        associate a unique identifier with a commerce good;
        receive a first query comprising a first value of a particular attribute and the unique identifier;
        receive a second query comprising a second value of the particular attribute and the unique identifier;
        determine a difference between the first value of the particular attribute and the second value of the particular attribute;
        determine that the difference between the first value and the second value meets a particular threshold;
        in response to the difference meeting the particular threshold, determine an authenticity of the commerce good; and
        upon receiving an indication of counterfeiting, prompting a user of the commerce good to provide a user identifying information.

9. The system of claim 8, wherein the at least one computing device is further configured to log information corresponding to a counterfeiter by sending an artifact responsive to determining the authenticity of the commerce good.

10. The system of claim 8, wherein the at least one computing device is further configured to
generate an internet protocol uniform resource locator comprising a domain name and a top level domain and a path;
generate a QR code comprising the unique identifier and the domain name and the top level domain and the path;
generate a label comprising the QR code; and
affixing the label comprising a brand and the QR code to the commerce good.

11. The system of claim 10, wherein the first query comprises the domain name, the top level domain, and the path, and the at least one computing device is further configured to:
associating a product certificate authority with the unique identifier; and
verify the top level domain via the product certificate authority.

12. The system of claim 8, wherein:
the particular attribute comprises a location,
the difference comprises a distance between a first location corresponding to the first value and a second location corresponding to the second value,
the first query is received at a first time,
the second query is received at a second time, and
the at least one computing device is further configured to determine the authenticity of the commerce good based on a simultaneous combination of a second difference between the first time and the second time and the difference.

13. The system of claim 12, wherein the at least one computing device is configured to transmit a coupon having a unique identifier associated with the unique identifier of the commerce good, wherein upon detecting that the coupon has been used multiple times, indicating a counterfeiting of the commerce good, and wherein the at least one computing device is further configured to determine the authenticity of the commerce good by determining that the distance between the first location and the second location exceeds a threshold distance under a threshold amount of time.

14. A non-transitory computer-readable medium embodying a program that, when executed by at least one computing device, causes the at least one computing device to:
associate a unique identifier with a commerce good;
receive a first query comprising a first value of a particular attribute and the unique identifier;
receive a second query comprising a second value of the particular attribute and the unique identifier;
determine a difference between the first value of the particular attribute and the second value of the particular attribute;
determine that the difference between the first value and the second value meets a particular threshold;
in response to the difference meeting the particular threshold, determine an authenticity of the commerce good; and
upon receiving an indication of counterfeiting, prompting a user of the commerce good to provide a user identifying information.

15. The non-transitory computer-readable medium of claim 14, wherein the program further causes the at least one computing device to transmit an alert to an interested party associated with the commerce good in response to determining that the commerce good is inauthentic.

16. The non-transitory computer-readable medium of claim 14, wherein the program further causes the at least one computing device to set a counterfeit flag associated with the commerce good in response to determining that the commerce good is inauthentic.

17. The non-transitory computer-readable medium of claim 16, wherein the program further causes the at least one computing device to:
receive a third query comprising query data and the unique identifier; and
in response to the counterfeit flag being set, store the query data as evidence relating to an identity of a counterfeiter.

18. The non-transitory computer-readable medium of claim 16, wherein the program further causes the at least one computing device to:
receive a third query comprising query data and the unique identifier; and
in response to the counterfeit flag being set, transmit an artifact to a computing device of a counterfeiter that scanned a QR code associated with the third query.

19. The non-transitory computer-readable medium of claim 18, wherein the program further causes the at least one computing device to cause the computing device to render a request for an additional identifying information associated with the counterfeiter to use the artifact that includes a coupon, in response to the counterfeit flag being set.

20. The non-transitory computer-readable medium of claim 14, wherein the program further causes the at least one computing device to receive the first query responsive to a scanning of a QR code via a user computing device, wherein the first query comprises comprising GPS data associated with the user computing device based on the QR code.

* * * * *